(12) United States Patent
Molisch et al.

(10) Patent No.: US 7,673,219 B2
(45) Date of Patent: Mar. 2, 2010

(54) COOPERATIVE RELAY NETWORKS USING RATELESS CODES

(75) Inventors: Andreas F. Molisch, Arlington, MA (US); Neelesh B. Mehta, Needham, MA (US); Jonathan S. Yedidia, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1021 days.

(21) Appl. No.: 11/377,711

(22) Filed: Mar. 16, 2006

(65) Prior Publication Data
US 2007/0217432 A1 Sep. 20, 2007

(51) Int. Cl.
*G11C 29/00* (2006.01)
(52) U.S. Cl. .................. 714/772; 714/820
(58) Field of Classification Search .......... 375/141; 380/247; 370/474, 329, 441; 714/780, 772, 714/820
See application file for complete search history.

(56) References Cited

U.S. PATENT DOCUMENTS

| | | | | |
|---|---|---|---|---|
| 5,809,141 A * | 9/1998 | Dent et al. | ............. | 380/247 |
| 6,310,893 B1 * | 10/2001 | Yuan et al. | ............. | 370/474 |
| 7,116,649 B2 * | 10/2006 | Ma et al. | ............. | 370/329 |
| 7,269,781 B2 * | 9/2007 | Weissman et al. | ......... | 714/780 |
| 2005/0047427 A1 * | 3/2005 | Kashima et al. | ........... | 370/441 |
| 2007/0201536 A1 * | 8/2007 | Nicolas et al. | ............. | 375/141 |

OTHER PUBLICATIONS

A. Nosratinia, T. Hunter, and A. Hedayat, "Cooperative communication in wireless networks," IEEE Communications Magazine, vol. 42, pp. 68-73, 2004.
Sendonaris, E. Erkip, and B. Aazhang, "User cooperation diversity-Part I: System description," IEEE Transactions on Communications, vol. 51, pp. 1927-1938, 2003.
J. N. Laneman, D. N. C. Tse, A. Stefanov and E. Erkip, "Cooperative coding for wireless networks," IEEE Trans. Commun. , pp. 1470-1476, Sep. 2004.
G. W. Wornell, "Cooperative diversity in wireless networks: Efficient protocols and outage behavior," IEEE Transactions on Information Theory, vol. 50, pp. 3062-3080, 2004.
A. Wittneben, I. Hammerstroem, and M. Kuhn, "Joint cooperative diversity and scheduling in low mobility wireless networks," IEEE Global Telecommunications Conference (Globecom), vol. 2, pp. 780-784, 2004.
A. E. Khandani, J. Abounadi, E. Modiano, and L. Zheng, "Cooperative routing in wireless networks," Allerton Conference on Communications, Control and Computing, 2003.
Rankov and A. Wittneben, "Distributed spatial multiplexing in a wireless network," The Asilomar Conference on Signals, Systems, and Computers, pp. 1932-1937, 2004.

(Continued)

*Primary Examiner*—David Ton
(74) *Attorney, Agent, or Firm*—Dirk Brinkman; Gene Vinokur

(57) ABSTRACT

A system and method for communicating information in a wireless cooperative relay network of nodes, the nodes including a source, a set of relays, and a destination. The source broadcasts a code word encoded as a data stream using a rateless code. The relays receive the data stream, decode the data stream to recover the code word, and reencode and transmit the recovered code word as the data stream with the rateless code. The destination receives and decodes the reencoded data streams to recover the code word.

17 Claims, 6 Drawing Sheets

OTHER PUBLICATIONS

G. Barriac, R. Mudumbai, and U. Madhow, "Distributed Beamforming for Information Transfer in Sensor Networks," IPSN 2004, pp. 81-88, 2004.

J. Luo, R. S. Blum, L. J. Cimini, L. J. Greenstein, and A. M. Haimovich, "Link-Failure Probabilities for Practical Cooperative Relay Networks," IEEE Globecom 2005.

Zinan Lin and Elza Erkip "Relay Search Algorithms for Coded Cooperative Systems," IEEE Globecom 20005.

Abdallah and H. C. Papadopoulos, "Beamforming algorithms for decode-and-forward relaying in wireless networks," Conference on Information Sciences and Systems, 2005.

Y. Zhao, R. Adve, and T. J. Lim, "Outage probability at arbitrary SNR with cooperative diversity," IEEE Communications Letters, pp. 700-702, 2005.

A. Khisti, U. Erez, and G. Wornell, "Fundamental limits and scaling behavior of cooperative multicasting in wireless networks," IEEE Trans. Information Theory, submitted, 2006.

I. Maric and R. D. Yates, "Cooperative multihop broadcast for wireless networks," IEEE J. Selected Areas Comm., pp. 1080-1088, 2004.

I. Maric and R. D. Yates, "Cooperative multicast for maximum network lifetime," IEEE J. Selected Areas Comm., pp. 127-135, 2005.

C.F. Leanderson, G. Caire, and O. Edfors, "On the Performance of Incremental Redundancy Schemes with Turbo Codes," Proc. Radiovetenskap och Kommunikation 2002, pp. 57-61, Jun. 2002.

O. Etasami, M. Molkaraie, and A. Shokrollahi, "Raptor codes on symmetric channels," in Proc. Int. Symp. Information Theory, p. 38, 2004.

R. Palanki and J. Yedidia, "Rateless codes on noisy channels," in Proc. Int. Symp. Information Theory, p. 37, 2004.

H. Jenkac and T. Stockhammer, "Asynchronous media streaming over wireless broadcast channels," in IEEE Int. Conf. Multimedia and Expo 2005, pp. 1318-1321, 2005.

Castura et al.:"Rateless Coding for Wireless Relay Channels," Sep. 4, 2005.

* cited by examiner

100

200

COOPERATIVE RELAY NETWORKS USING RATELESS CODES

FIELD OF THE INVENTION

The invention relates generally to wireless communications networks, and more particularly to communicating in cooperative relay networks and multi-hop networks.

BACKGROUND OF THE INVENTION

Cooperative Relay Networks

In conventional relay networks, data packets are transmitted from a source node to a destination node via a single path with, perhaps, multiple serial hops through relay nodes.

In a cooperative relay networks, wireless nodes cooperate with each other in transmitting data packets in parallel. By exploiting the broadcast nature of a wireless channel to reach multiple relay nodes concurrently, and by enabling the relay nodes to cooperate, it is possible to reduce power consumption in delivering a packet from the source to the destination. This can also significantly increase gains in overall throughput and power efficiency, A. Nosratinia, T. Hunter and A. Hedayat, "Cooperative communication in wireless networks," IEEE Communications Magazine, vol. 42, pp. 68-73, 2004; A. Sendonaris, E. Erkip and B. Aazhang, "User cooperation diversity-Part I: System description," IEEE Transactions on Communications, vol. 51, pp. 1927-1938, 2003; A. Jardine, S. McLaughlin and J. Thompson, "Comparison of spacetime cooperative diversity relaying techniques," in Proc. IEEE VTC 2005—Spring, pp. 2374-2378, 2005; J. N. Laneman, D. N. C. Tse, A. Stefanov and E. Erkip, "Cooperative coding for wireless networks," IEEE Trans. Commun., pp. 1470-1476, September 2004; and G. W. Wornell, "Cooperative diversity in wireless networks: Efficient protocols and outage behavior," IEEE Transactions on Information Theory, vol. 50, pp. 3062-3080, 2004.

Cooperative relay network are useful for low cost, low power, low complexity sensor networks. If the nodes are powered by batteries, then minimizing power consumption is important. Minimizing total transmission time is one way to minimize power consumption.

Typically, the source node transmits data packets to the destination node in parallel using several intermediate relay nodes in parallel, A. Wittneben, I. Hammerstroem and M. Kuhn, "Joint cooperative diversity and scheduling in low mobility wireless networks," IEEE Global Telecommunications Conference (GLOBECOM), vol. 2, pp. 780-784, 2004; A. E. Khandani, J. Abounadi, E. Modiano and L. Zheng, "Cooperative routing in wireless networks," Allerton Conference on Communications, Control and Computing, 2003; and B. Rankov and A. Wittneben, "Distributed spatial multiplexing in a wireless network," The Asilomar Conference on Signals, Systems, and Computers, pp. 1932-1937, 2004.

Cooperative beamforming is also referred to as distributed beamforming, see G. Barriac, R. Mudumbai and U. Madhow, "Distributed Beamforming for Information Transfer in Sensor Networks," IPSN 2004, pp. 81-88, 2004. Mechanisms for enabling synchronization between relays using a trigger pulse mechanism from a master relay node were described. The effect of coordination error was analyzed. However, they do not take any relay selection or outage into account. The overall power consumption from the source to destination is also not considered.

Four simple relay selection criteria are described by J. Luo, R. S. Blum, L. J. Cimini, L. J. Greenstein and A. M. Haimovich, "Link-Failure Probabilities for Practical Cooperative Relay Networks," IEEE Globecom 2005. Two of the criteria, 'Pre-Select One Relay' and 'Best-Select Relay,' select a single best relay based on a mean channel gain, while in the remaining two criteria, 'Simple Relay' and 'ST-Coded Relay,' all the relays that decode data from source are selected. In 'Simple Relay,' the relay nodes do not synchronize their phase, while in 'ST-Coded Relay,' a distributed space-time code is used. Hybrids of the above schemes were also described.

Search algorithms for selecting a single relay node based on an average distance or path loss between the nodes, a frame error probability, and a pairwise code word error probability were described in Z. Lin and E. Erkip "Relay Search Algorithms for Coded Cooperative Systems," IEEE Globecom, 2005.

Khandani et al. describe a model that is restricted to additive white Gaussian noise (AWGN) channels with phase compensation. That model does not consider dynamic fading-induced channel variations, outage, or the overhead required for cooperation between relay nodes.

Knowledge of the channel state information (CSI) at a transmitter is assumed by Laneman et al. and Rankov et al. above. However, they do not consider the cost of acquiring the CSI. Wittneben et al. only considers amplify-and-forward, which also neglects the cost of acquiring the CSI, see also M. M. Abdallah and H. C. Papadopoulos, "Beamforming algorithms for decode-and-forward relaying in wireless networks," Conference on Information Sciences and Systems, 2005.

If the relay nodes do not have the CSI, then the receiver can, at best, accumulate the mutual information from the various relay nodes, e.g., through space-time coding, see Luo et al. and Jardine et al. Outage analysis of such relay schemes, when the links operate at a given signal-to-noise ratio, are described by Y. Zhao, R. Adve and T. J. Lim, "Outage probability at arbitrary SNR with cooperative diversity," IEEE Communications Letters, pp. 700-702, 2005; and A. Khisti, U. Erez, and G. Wornell, "Fundamental limits and scaling behavior of cooperative multicasting in wireless networks," IEEE Trans. Information Theory, submitted 2006.

Mutual information accumulation is also assumed for a multicast and broadcast analysis described by I. Maric and R. D. Yates, "Cooperative multihop broadcast for wireless networks," IEEE J. Selected Areas Comm., pp. 1080-1088, 2004; and I. Maric and R. D. Yates, "Cooperative multicast for maximum network lifetime," IEEE J. Selected Areas Comm., pp. 127-135, 2005.

Rateless Codes

Rateless codes were developed to deal with communication scenarios where the receiver and transmitter do not know the channel statistics before transmitting. In such situations, using a standard block error-correcting code that is too weak for the channel noise, leads to unreliable communication, while using a block error-correcting code that is too strong for the channel noise is wasteful.

Rateless codes solve this problem. Instead of encoding the information bits to a pre-determined number of bits as in a standard block error-correcting code, the transmitter encodes the information bits into a potentially infinite stream of bits and starts transmitting the bits. After the receiver receives a sufficient number of bits, the receiver can decode the information bits, and the number of transmitted bits is efficient with respect to the channel.

Rateless codes have a long history in coding theory. For example, in 1974, Mandelbaum described puncturing low-rate block codes to build such a system, see D. M. Mandelbaum, "An Adaptive-Feedback Coding Scheme Using Incremental Redundancy," IEEE Transactions on Information Theory, vol. 20, pp. 388-389, May 1974. Additional bits could be transmitted, at the request of the receiver, by sending bits that had previously been punctured. Mandelbaum used Reed-Solomon codes in his scheme, while others have investigated similar systems based on low-rate convolutional codes and turbo-codes, see J. Hagenauer, "Rate-compatible Punctured Convolutional Codes and their Applications," IEEE Transactions on Communications, vol. 36, pp. 389-400, April 1998; and C. F. Leanderson, G. Caire and O. Edfors, "On the Performance of Incremental Redundancy Schemes with Turbo Codes," Proc. Radiovetenskap och Kommunikation, pp. 57-61, June 2002.

Rateless codes were originally designed for erasure channels, but their performance for AWGN channels is good, see O. Etasami, M. Molkaraie and A. Shokrollahi, "Raptor codes on symmetric channels," in Proc. Int. Symp. Information Theory, p. 38, 2004; and R. Palanki and J. Yedidia, "Rateless codes on noisy channels," in Proc. Int. Symp. Information Theory, p. 37, 2004.

Rateless codes have also been used for wired Ethernet-like applications, as well as for point-to-point and broadcast and multicast applications in wireless networks, J. Castura and Y. Mao, "Rateless coding over fading channels," IEEE Communications Letters, vol. 10, pp. 46-48, 2006; and H. Jenkac and T. Stockhammer, "Asynchronous media streaming over wireless broadcast channels," in IEEE Int. Conf. Multimedia and Expo 2005, pp. 1318-1321, 2005.

SUMMARY OF THE INVENTION

The embodiments of the invention provide a system and method for a cooperative relay network of nodes. The cooperative network includes a source node, multiple relay nodes, and a destination node. The code word is encoded as a data stream using a rateless code. The data stream is broadcast from the source node to the relay nodes. The relay nodes forward the data streams to the destination node. The destination node can then accumulate mutual information while traditional energy collection methods, such as repetition or cooperative space-time codes, only accumulate energy.

By using rateless codes, the total transmission time, as well as possibly the total power required for transmitting code words from the source node to the destination node, is reduced.

In one embodiment of the invention, the source stops transmitting and the relay nodes start transmitting after a predetermined number of relay nodes have successfully decoded the code word. The method can optimize the number to make either the transmission time or the total power consumption as small as possible.

In an alternative embodiment, each relay node starts transmitting to the destination node as soon as it has decoded the code word, independent of the state of the other relay nodes. This further reduces the total power consumption because the transmission by the relay nodes can be received by other relay nodes and assists the other relay nodes that are still in receive mode in decoding their code words.

DETAILED DESCRIPTION OF THE PREFERRED EMBODIMENT

Figure 1:
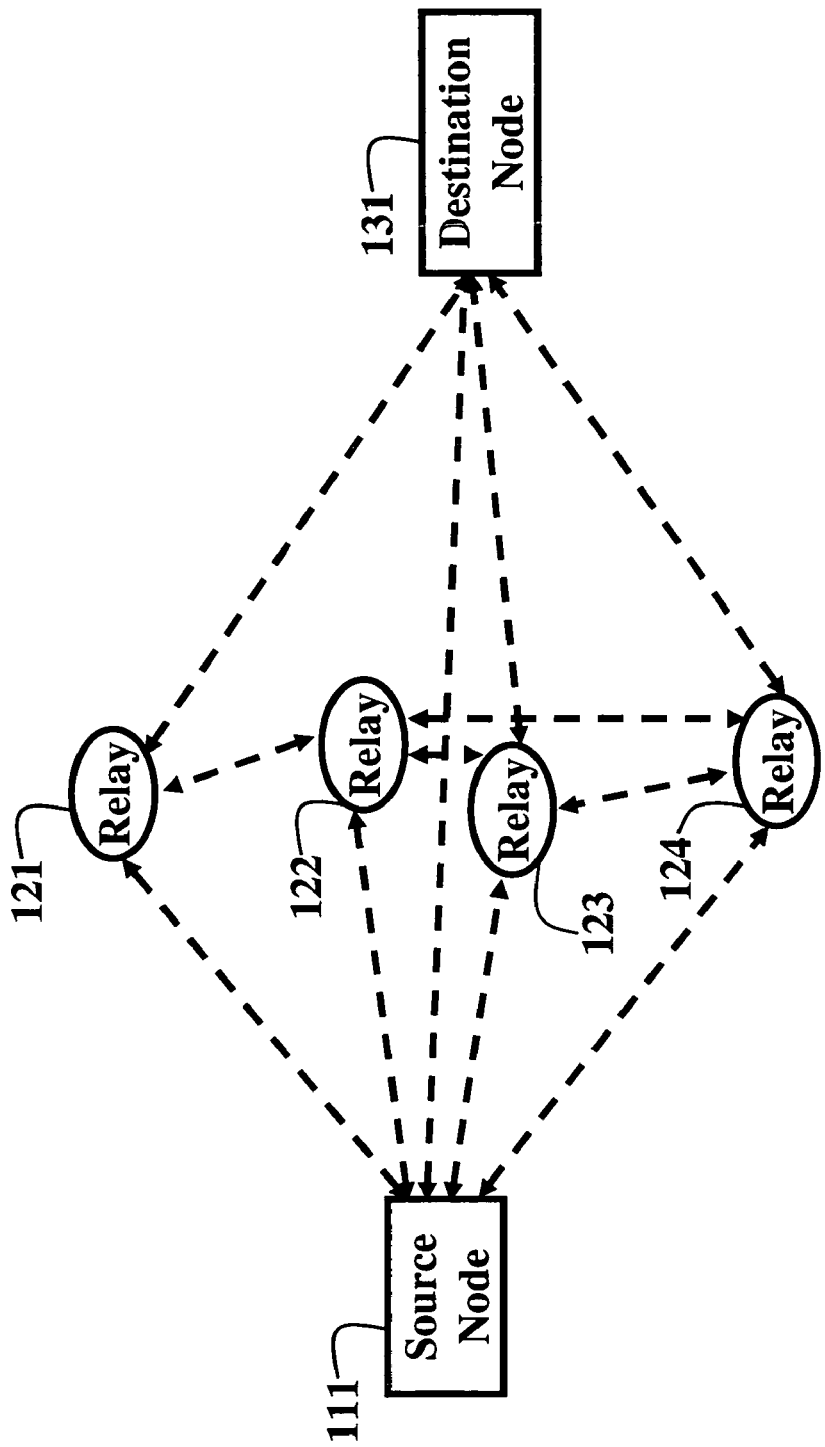
FIGS. 1 and 2 are diagrams of cooperative relay networks according embodiments of the invention.
Figure 2:
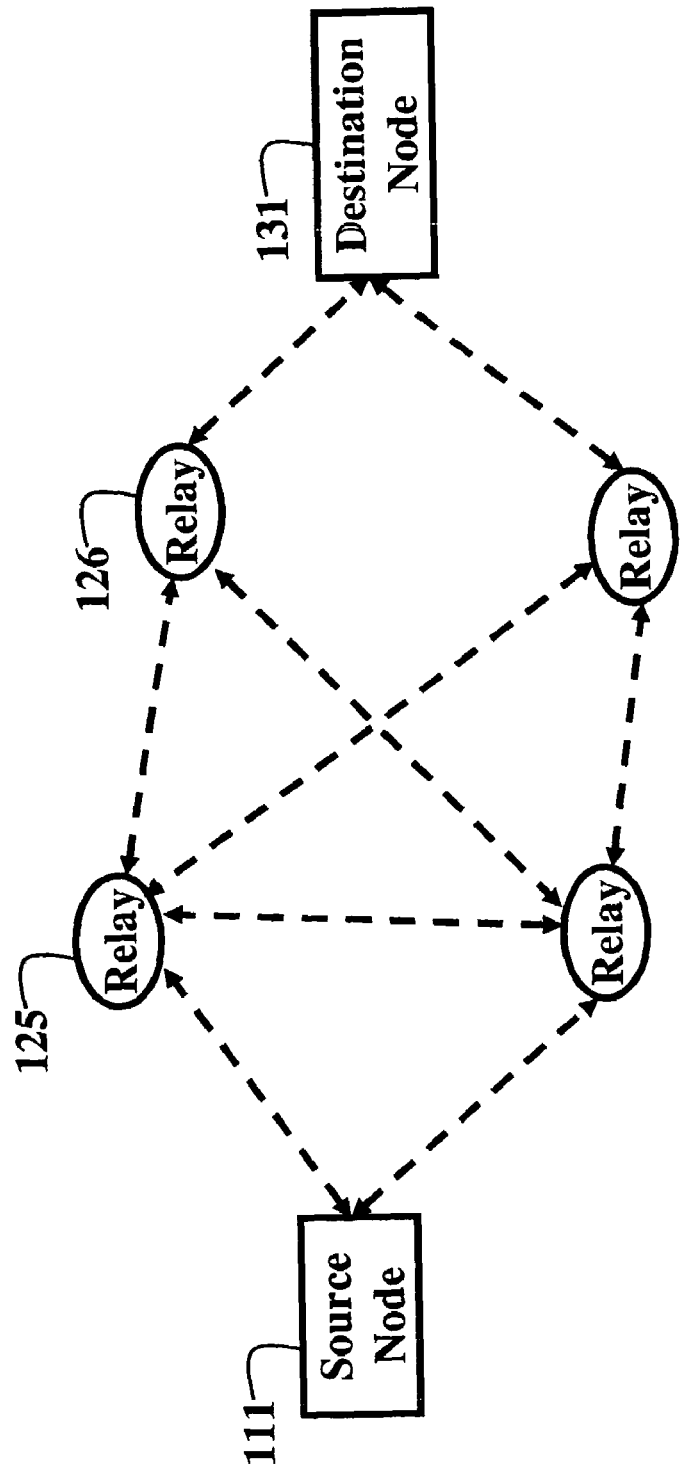

FIGS. 1 and 2 show cooperative relay networks 100 and 200 according to embodiments of our invention. The cooperative relay network 100 includes a source node 111, a set of N relay nodes 121-124, and a destination node 131, i.e., source, relays, and destination, respectively. It should also be understood, that the embodiments of the invention can also by used with multiple relay 'hops' as shown in FIG. 2. In this case, relay 125 also acts as a 'source' for an 'intermediate' relay 126. This scheme can be extended to additional hops. The following description refers to the case of a single hop, but all the below-described methods are equally valid for the case that includes intermediate relays.

It is desired to minimize either transmission time and/or power consumption in cooperative relay networks while sending data packets, possibly subject to constraints with respect to outage, where outage is defined as not having a successful transmission within a predetermined time or within a predetermined energy.

The source node sends a code word to the destination node via a set of N parallel relay nodes. The code word can be, for example, a file of data bytes (information). The relay nodes use a decode-and-forward technique. The code word has a bandwidth-normalized entropy of size $H_{target}$, given in scaled nats/Hz, where a nat is information in natural units, i.e., Euler's constant, 2.71. . . .

The source, as well as the relays, uses rateless codes for encoding the code word. All nodes operate in half-duplex mode, i.e., a node can either transmit or receive, but not both simultaneously.

In the following, we allow transmission with a direct-sequence spectrum spreading technique. Such an approach is useful for relay networks, as it allows different data streams to be transmitted in a flexible and decentralized way, and the data streams can be distinguished at the receiver. The transmit power of all nodes is $P_T$. The propagation channels between the nodes are modeled as frequency-flat, block fading channels. The channel gains are independent and exponential-distributed, corresponding to Rayleigh fading of the amplitudes. Again, note that these assumptions are made only to provide an example, and that different multiple access schemes, as well as different transmit powers for the different nodes, possibly varying with the remaining battery lifetime, the average channel state, or the instantaneous channel state, can be used in conjunction with our methods.

Our receivers are mutual information accumulating receivers. These receivers can distinguish the various information streams from different relays that might arrive concurrently. For example, the receivers can use multi-user detection to distinguish the different rateless codes. In a CDMA system, a receiver can process the received data streams from the different relay nodes when the data streams arrive with relative delays that are larger than the chip duration. Alternatively, we can also use space-time codes or cooperative beamforming for transmission.

The receivers include rateless code decoders, so that data streams from different relay nodes can be distinguished, and the mutual information of signals transmitted by relay nodes can be accumulated. In one embodiment of the invention for a CDMA system, the different nodes use different spreading codes in order for the destination to separate the different data streams and to extract the information contained in the data streams. However, different spreading codes are not always necessary. For example, when all relays use the same rateless code and send their signals to the destination synchronously, the same spreading codes can be used.

Quasi-Synchronous Transmission

Figure 3:
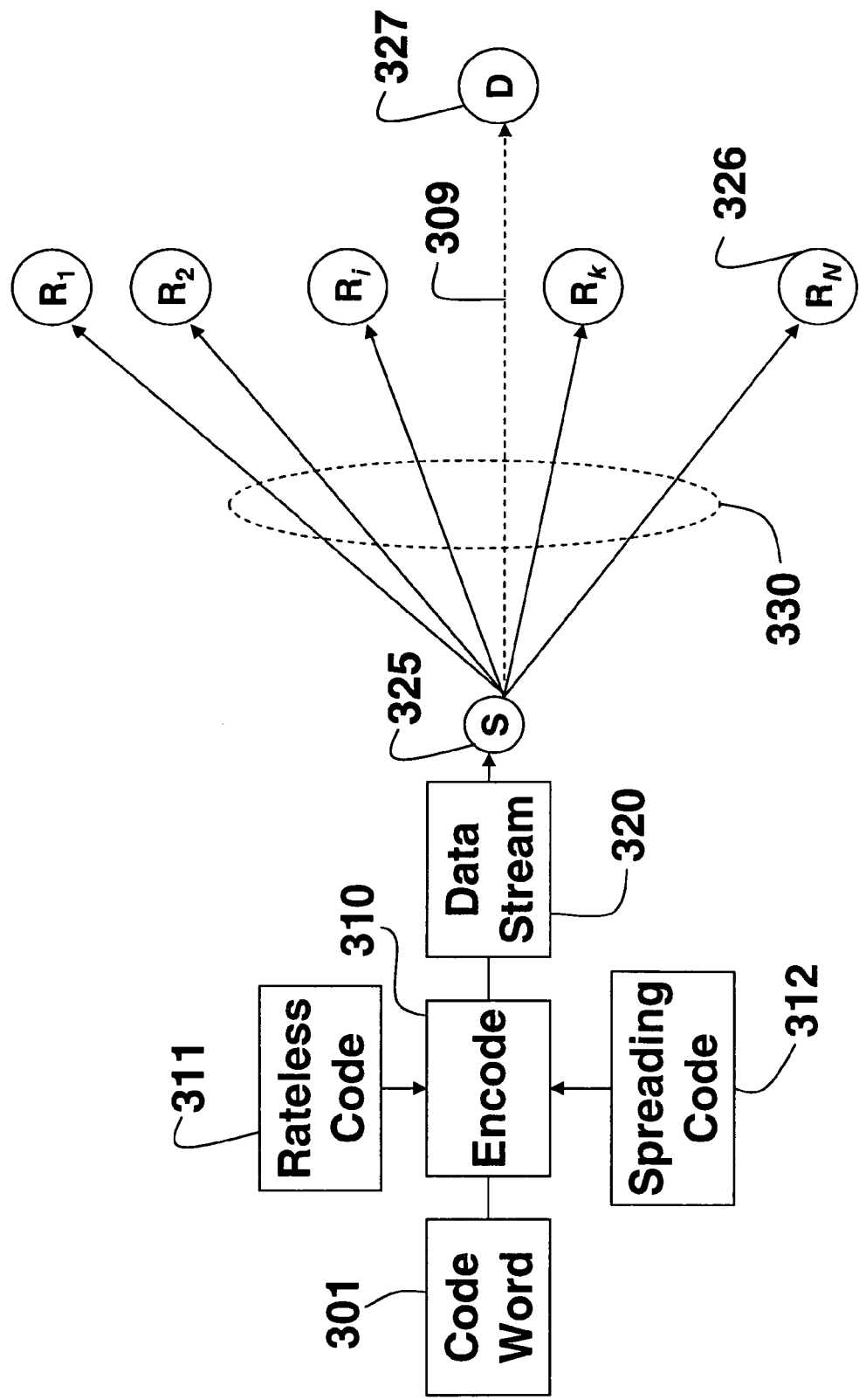
FIG. 3 shows a broadcast step of a protocol according to an embodiment of the invention.

As shown in FIG. 3, a code word 301 is encoded 310 using a rateless code 311 and, optionally, a spreading code 312 to produce a data stream 320. The code word 301 can be any arbitrary accumulation collection of bits or 'information.' A source (S) 325 broadcasts 330 the data stream to be received by the destination (D) 327 to a set of relay nodes (R) 326. The broadcast of the data stream can be in the form of packets.

Figure 4:
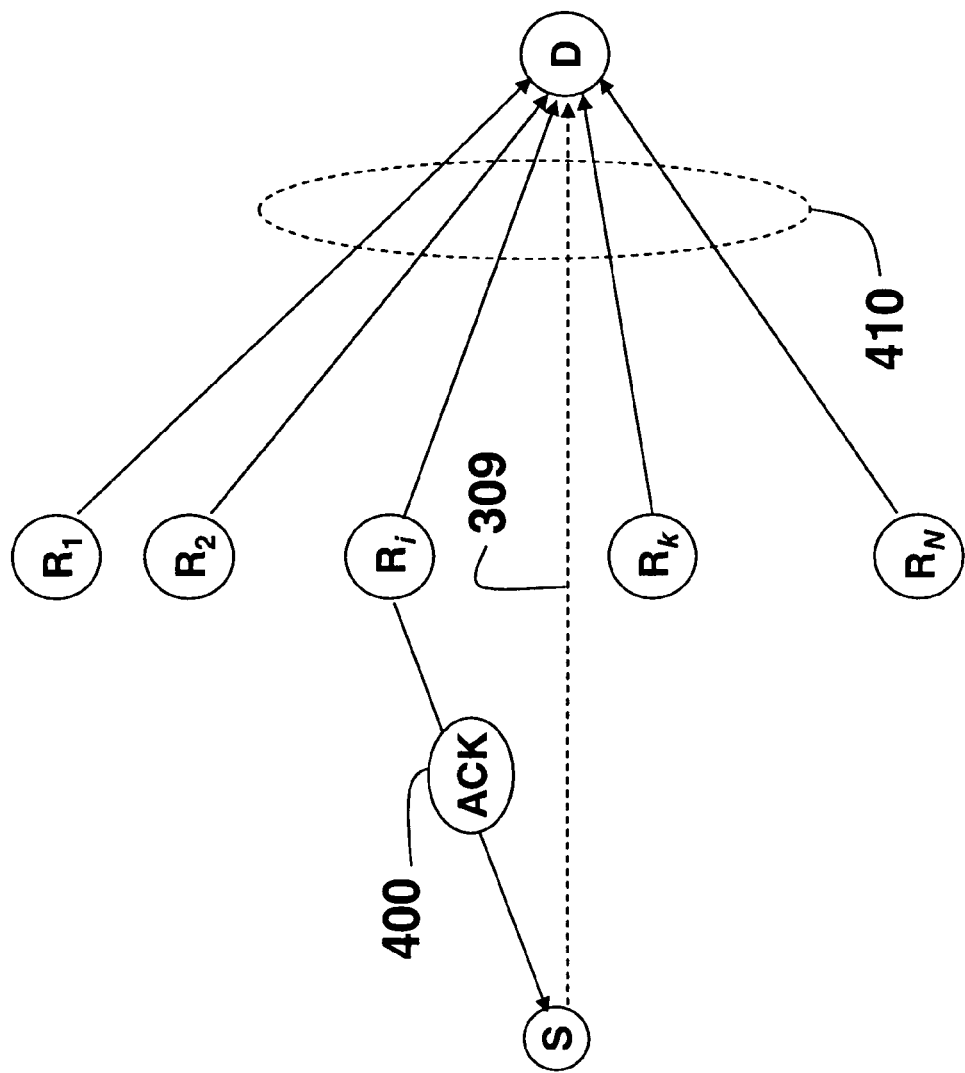
FIG. 4 shows an acknowledgement step of a protocol according to an embodiment of the invention.

As shown in FIG. 4, as soon each relay has accumulated sufficient mutual information to decode the data stream to recover the code word, the relay transmits an acknowledgement (ACK) 400 back to the source that the reception was successful.

After the source receives a predetermined number of acknowledgements 400, the source terminates the broadcasting, possibly after informing the relay nodes about the termination of the broadcasting from the source.

Concurrently, the relay nodes reencode the recovered code word to the data stream, and switch from reception to transmission. For this second phase, we consider two cases:

First, all the relay nodes transmit the data stream 410 encoded with the same rateless code. The rateless code can be the same as that used by the source. Due to the delay difference inherent in the transmission from randomly located relay nodes, the data streams arrive at the destination with slightly different delays. In the following, we assume that those delays are larger than a chip duration, but much smaller than the symbol duration. This assumption can be achieved in direct-sequence CDMA systems with large spreading factors. The destination is capable of accumulating the mutual information of the data streams received from the relay nodes.

Second, each relay node uses a different rateless code and a different spreading code for the transmission of the data streams 410. In this case, the destination can distinguish the signals from the different relay nodes through their different spreading codes, and accumulates the mutual information. It should be noted that the destination can also use the data stream 309 broadcast by the source.

Figure 5:
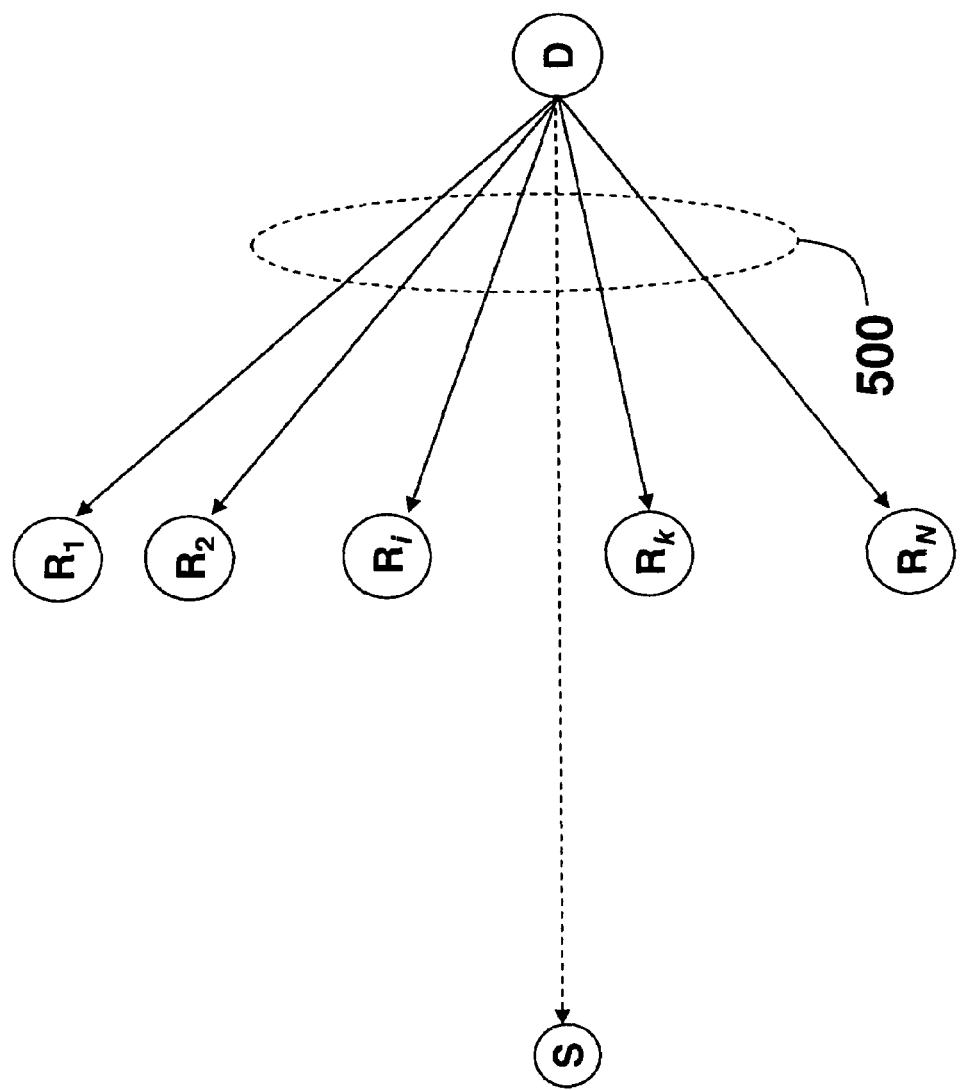
FIG. 5 shows a termination step of a protocol according to an embodiment of the invention.

In either case, as shown in FIG. 5, the destination broadcasts a signal 500 to the relay nodes, and possibly even to the source, to terminate transmission as soon as the destination has successfully decoded the data streams transmitted by the relays, and possibly the source, to recover the code word.

Intuitively, the difference between the use of single and multiple rateless codes can most easily be understood for the simple example of binary signaling using two relays on an erasure channel with erasure probability $p_e$. If the relays use the same rateless code, then each bit will be erased with probability $p_e^2$, so $1-p_e^2$ bits are effectively received per relay transmission.

On the other hand, if two different rateless codes are used, the transmissions are independent, and $2(1-p_e)$ bits per relay transmission are received. Note that the complexity of the receivers required for the two protocols does not differ significantly. If the sampling rate of an analog-to-digital converter (ADC) in the receiver is identical to the symbol rate, then both receivers require L correlators. In the first case, all correlators form the correlation with the same spreading sequence, and add up the results according to maximum-ratio combining.

Alternatively, a receiver can use only a single correlator, whose output is sampled L times during each symbol duration. This saves some hardware complexity. However, the signals can arrive from the different relay nodes at irregular intervals, and thus necessitate an ability of the ADC to sample at the chip rate. This fast sampling of the ADC increases power consumption significantly, and thus might not be desirable for battery powered sensor-network applications.

In the second case, each correlator is used for the detection of the signal from a different relay node. The main difference lies in the decoder, which is more complex if multiple rateless codes are used. The spectral efficiency of the second method is worse, because it uses up multiple spreading codes for the transmission of one code word, though the improved coding gain partly offsets this effect.

Note also that a combination of the first case and the second case can also be used.

Asynchronous Transmission

With the quasi-synchronous transmission as described above, the relay nodes only receive the data streams broadcast by the source node. However, when we use rateless codes, the relay nodes can also 'help' the other relays to decode the data streams faster, and thus accelerate the transmission process, and thus reducing power consumption. The idea is that a relay node starts to transmit the reencoded data stream to the destination as soon as the relay has received sufficient information to decode the code word. This transmission can also be received by other relay nodes that are still in the receive mode. Thus, the relay nodes that are in transmit mode help the relay nodes that are still receiving to decode the data stream faster. That is, the other relays decode both the broadcast data stream and reencoded data streams.

As was shown in FIG. 3, the source node starts by broadcasting the data stream to all of the relay nodes using the assigned spreading code and rateless code.

All relay nodes accumulate continually the mutual information. The source signals when the transmission with a given spreading code starts to avoid unnecessary reception of noise by the receivers. The source stops transmission as described for FIG. 4.

Figure 6:
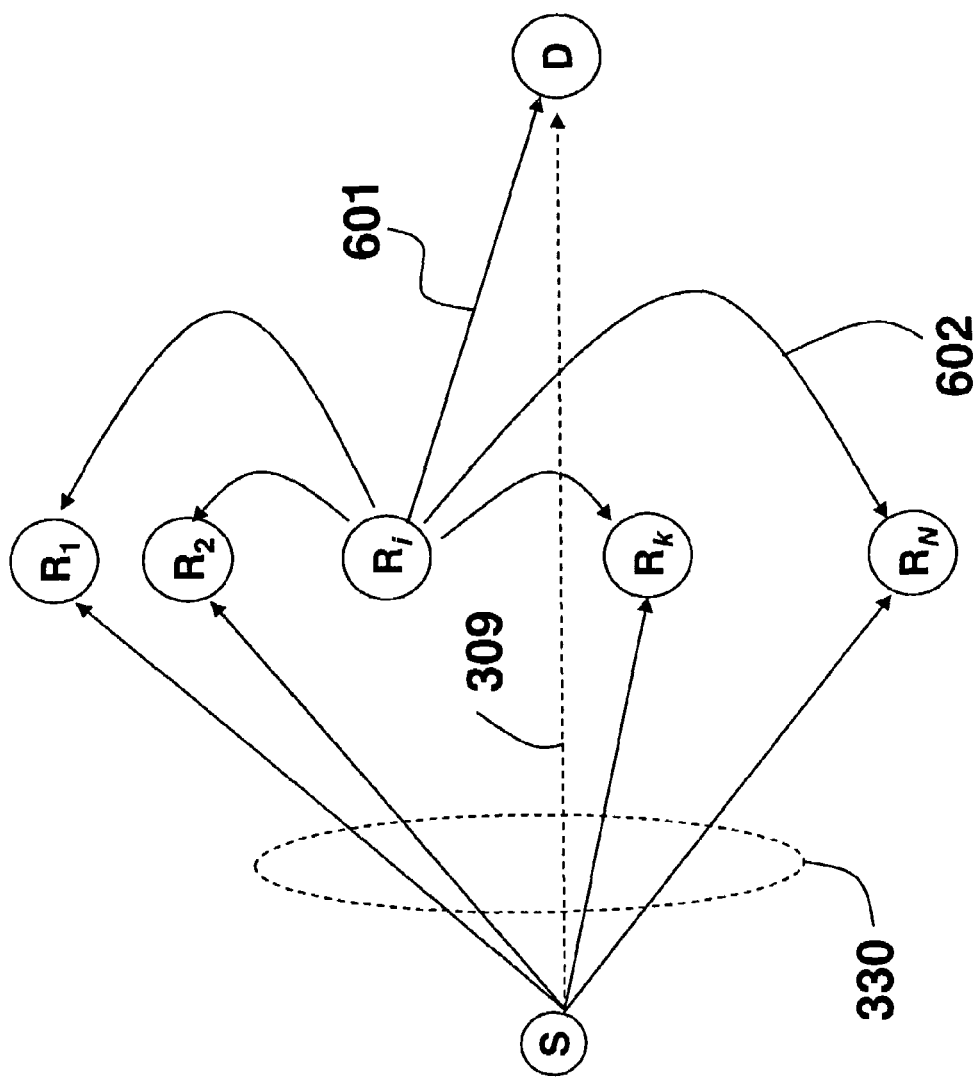
FIG. 6 shows a transmit step of a synchronous protocol according to an embodiment of the invention.

As shown in FIG. 6, as soon as a relay node has sufficient information to decode the code word, it switches from receive mode to transmit mode. The relay retransmits the code word as the data stream 601 using its assigned spreading and rateless code. Because the relay nodes that are in reception mode observe all spreading codes simultaneously, they can receive the data stream 330 from the source node and the data streams 602 from the relay nodes that are transmitting to the destination, and accumulate the mutual information from all those nodes, to decode the data streams faster.

The destination node is continuously receiving all the data streams for the different relays, and thus accumulating the information from the various relay nodes. As described above, the destination can also use the contribution 309 received directly from the source.

The destination broadcasts, as shown in FIG. 5, the signal 500 to the relay nodes, and perhaps also to the source, to terminate transmission as soon as it has successfully decoded the source data stream to recover the code word.

We assume that transmissions continue until the destination has successfully recovered the code word. Some power can be saved if the source monitors the relay nodes, and stops transmitting as soon as all relay nodes are in transmit mode.

EFFECT OF THE INVENTION

The embodiments of the invention provide methods for using rateless codes in cooperative relay networks using quasi-synchronous and asynchronous protocols. In the quasi-synchronous case, all relay nodes switch from receive mode to transmit at the same time, while in the asynchronous case, each relay node switches to transmit mode as soon as it has decoded the source data stream.

For synchronous transmission, there is a distinct optimum for the number of relay nodes that should transmit the information to minimize total power consumption. This optimum typically lies around L=2 to 4. Furthermore, the asynchronous protocol can lead to additional power reduction, and, especially, reduce the total transmission time.

For the quasi-synchronous scheme, it is be possible to achieve the same performance without rateless codes if the transmitters have knowledge of the channel gains. The transmitters can simply use capacity-achieving codes specifically suitable for the channel gain available on the desired link. Note, however, that in this case a feedback of all the channel gains to the respective transmitters is required, which, for the downlink part, is less spectrally efficient than the single bit that informs the relays of the successful decoding. For the asynchronous scheme, rateless codes have a unique advantage because the rateless codes enable the 'better' relay nodes to help the 'weaker' relays recover the code word.

The transmission of conventional capacity-achieving codes, e.g., LDPC codes, from a relay node would not help the other relay nodes with their decoding until all the coded information bits have been received. The method described herein can be extended to a multi-hop relay network as shown in FIG. 2.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for communicating information in a wireless cooperative relay network of nodes, the nodes including a source, a set of relays, and a destination, comprising the steps of:
    encoding a code word as a data stream using a rateless code;
    broadcasting, from a source, the data stream;
    receiving, in each relay of a set of relays, the data stream;
    decoding, in each relay, the received data stream to recover the code word;
    reencoding, in each relay, the recovered code word as the data stream with the rateless code;
    transmitting, from each relay to a destination, the reencoded data stream;
    receiving, in the destination, the reencoded data streams; and
    decoding, in the destination, the reencoded data streams to recover the code word.

2. The method of claim 1, further comprising:
    encoding and reencoding the code word using a spreading code.

3. The method of claim 2, in which each relay uses a different rateless code and a different spreading code.

4. The method of claim 2, in which each relay uses a different rateless code and the destination uses multi-user detection to distinguish the different rateless codes.

5. The method of claim 1, in which the code word is an arbitrary accumulation of bits.

6. The method of claim 1, in which the data stream is broadcast as packets.

7. The method of claim 1, further comprising:
    transmitting, from each relay to the source, an acknowledgement, after the code word has been recovered.

8. The method of claim 7, further comprising:
    terminating the broadcasting after a predetermined number of acknowledgements have been received by the source.

9. The method of claim 1, in which each relay uses the same rateless code for the reencoding as the source used for the encoding.

10. The method of claim 1, further comprising:
    broadcasting, from the destination, a signal to terminate the transmitting, as soon as the destination has recovered the code word.

11. The method of claim 1, in which the set of relays transmit the reencoded data stream after all of the relays have recovered the code word.

12. The method of claim 1, in which each relay starts transmitting the reencoded data stream as soon as the relay has recovered the code word, and further comprising:
    receiving, in other relays of the set of relays, the reencoded data stream and the data stream broadcast by the source, and decoding the broadcast data stream and the reencoded data stream to recover the code word.

13. The method of claim 1, in which the source terminates the transmitting as soon as all of the relays are transmitting.

14. The method of claim 1, in which intermediate relay nodes in a multi-hop relay network are intermediate destinations, and further comprising:
    broadcasting, from the source to the intermediate destinations, the data stream; and
    forwarding, from the intermediate destinations to the destination.

15. The method of claim 1, in which each relay uses a different rateless code and a different spreading code, and each relay performs mutual information accumulation.

16. The method of claim 1, in which each relay uses a different rateless code and the destination uses multi-user detection to distinguish the different rateless codes, and further comprising:
    accumulating mutual information at each relay and the destination.

17. A system for communicating information in a wireless cooperative relay network of nodes, the nodes including a source, a set of relays, and a destination, comprising the steps of:
    means for encoding a code word as a data stream using a rateless code;
    a source configured to broadcast the data stream;
    a set of relays, each relay configured to receive and decode the data stream to recover the code word, and further configured to reencode and transmit the recovered code word as the data stream with the rateless code; and
    a destination configured to receive and decode the reencoded data streams to recover the code word.

* * * * *